ASA M. BOND.
Improvement in Machines for Preparing Beefsteak.
No. 114,396. Patented May 2, 1871.
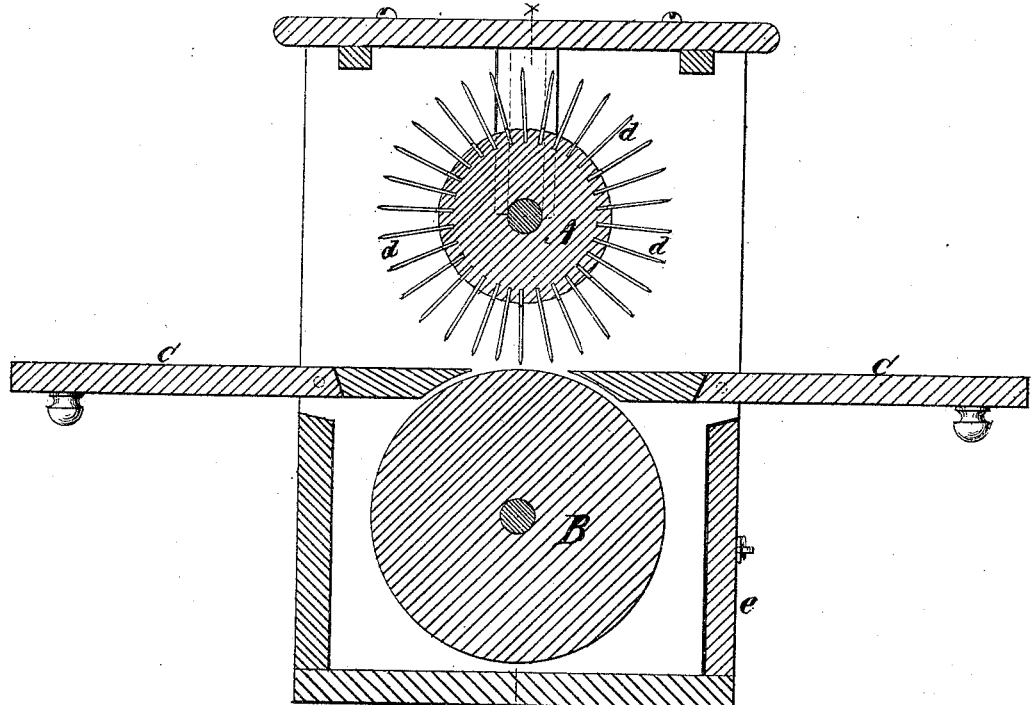
Fig. 1.
Fig. 2.
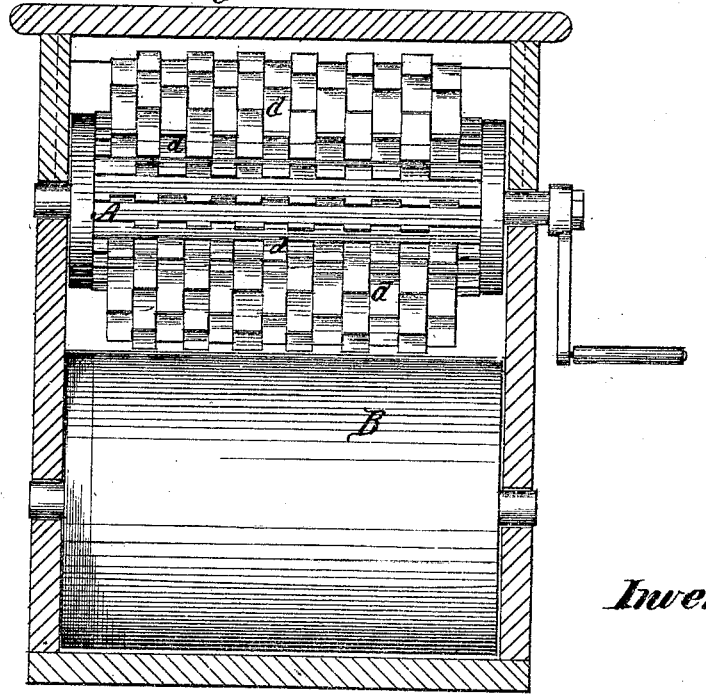
Witnesses.
Inventor.
Asa M. Bond

United States Patent Office.

ASA M. BOND, OF CONCORD, NEW HAMPSHIRE.

Letters Patent No. 114,396, dated May 2, 1871.

IMPROVEMENT IN MACHINES FOR PREPARING BEEFSTEAK.

The Schedule referred to in these Letters Patent and making part of the same.

I, ASA M. BOND, of Concord, in the county of Merrimack and State of New Hampshire, have invented an Improved Machine for Preparing Beefsteak, of which the following is a specification, reference being had to the accompanying drawing, of which drawing—

Figure 1 is a transverse section of my machine.

Figure 2 is a longitudinal section thereof.

To enable others skilled in the art to make and use my invention, I will proceed to describe its construction and mode of operation.

My machine consists of two cylindrical rollers, A and B, figs. 1 and 2, the larger roller at the bottom of my machine, B, being a plain wooden feed-roll; the smaller roller, A, being supplied with steel cutters $d$ radiating from the axis thereof, as shown in fig. 1.

The teeth of these cutters are made flat and about one-fourth inch broad, and the sets are so arranged upon the roller that the teeth do not follow each other in the same line, but alternate.

The upper portion of the box in which these rollers are adjusted lets down to form the small platforms C C, fig. 1, and, when the machine is not in use, may be shut up, making a light box inclosing the operating parts and protecting them from dust.

The machine is actuated by the crank at the end of the smaller roller.

The upper roller or cutters may be removed, for the purpose of cleaning the same, by unscrewing the cover, and the lower roller is cleaned, when necessary, by removing the lower part of one side of the box, (shown at $e$, fig. 1.)

I insert one end of a piece or slice of steak between the feed-roll B and the teeth or cutters attached to the upper roll A, and by turning the crank the whole piece is drawn through the machine and evenly perforated by the teeth or cutters, and the juices of the meat so perforated will remain in the meat.

The meat may be passed through the machine one or more times, as may be desired, and the effect is to render steak tender and juicy, and capable of being evenly and thoroughly cooked.

The number of sets of cutters may be increased or diminished to suit. I do not confine myself to the number of sets shown in the drawing.

I am aware that the patent of Horace Thompson, September 14, 1869, shows cutters similar to mine, but attached to a hinged arm instead of a roller, as my cutters $d$ are. I, therefore, disclaim cutters for preparing steak, *per se*.

I claim—

The combination of the roller A, radial cutters $d$, and feed-roller B, as specified.

Concord, February 6, 1871.

ASA M. BOND.

Witnesses:
L. D. STEVENS,
CHAS. C. LUND.